(12) United States Patent
Chen et al.

(10) Patent No.: US 8,429,620 B2
(45) Date of Patent: Apr. 23, 2013

(54) MEMORY LEAK DIAGNOSIS

(75) Inventors: Ying Chen, Beijing (CN); Qiming Teng, Beijing (CN); Xin Hui Li, Beijing (CN); Ying Li, Beijing (CN); Tian Cheng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 12/491,877

(22) Filed: Jun. 25, 2009

(65) Prior Publication Data

US 2009/0328007 A1    Dec. 31, 2009

(30) Foreign Application Priority Data

Jun. 27, 2008 (CN) .......................... 2008 1 0131740

(51) Int. Cl.
  *G06F 9/44* (2006.01)
(52) U.S. Cl.
  USPC ............................................ 717/128; 714/42
(58) Field of Classification Search ................... None
  See application file for complete search history.

(56) References Cited

U.S. PATENT DOCUMENTS

| 6,167,535 | A | * | 12/2000 | Foote et al. ............... 714/38.11 |
| 7,194,664 | B1 | * | 3/2007 | Fung et al. ...................... 714/45 |
| 7,200,731 | B2 | | 4/2007 | Raut | |
| 7,257,692 | B2 | | 8/2007 | Schumacher | |
| 7,587,709 | B2 | * | 9/2009 | Chilimbi et al. ............... 717/130 |
| 2004/0216091 | A1 | * | 10/2004 | Groeschel ...................... 717/128 |
| 2005/0071387 | A1 | * | 3/2005 | Mitchell et al. ............... 707/201 |
| 2005/0091646 | A1 | * | 4/2005 | Chilimbi et al. ............... 717/130 |
| 2007/0067758 | A1 | * | 3/2007 | Findeisen et al. ............. 717/140 |

FOREIGN PATENT DOCUMENTS

WO    WO9303435 A1    2/1993

OTHER PUBLICATIONS

Ostlund, "Memory Leak Detection with the JRockit JVM", http://weblogic.sys-con.com/node/48224, Feb. 11, 2005.
Java Performance Tuning, http://www.javaperformancetuning.com/tools/netbeansprofiler/index.shtml, (Nov. 2005).

* cited by examiner

*Primary Examiner* — Elias Mamo
(74) *Attorney, Agent, or Firm* — Cantor Colburn LLP; Dwayne Nelson

(57) ABSTRACT

A method and an apparatus for diagnosing memory leak. The method includes: tracing the allocation of objects; recording allocation paths and allocation time of each object; giving to each object one unique identifier (ID) corresponding to an allocation path; determining the allocation path to which each object belongs; organizing the objects which are allocated but still not collected, and counting the age generations of the objects of the similar type according to the allocation time of each object; ranking the allocation paths according to the age generations of the surviving objects; and analyzing the ranking of the allocation paths, in which the allocation path with higher rank is more probable to introduce memory leaks. Thus, the suspicious allocation path possibly incurring memory leaks is selected and reported to the user for analysis.

7 Claims, 7 Drawing Sheets

| Band id | Group id | Class c | Path p | Mehod m | Callee c |
|---|---|---|---|---|---|

Figrue 2

MEMORY LEAK DIAGNOSIS

CROSS REFERENCE TO RELATED APPLICATIONS

This application claims priority under 35 U.S.C. §119 from Chinese Patent Application number 200810131740.3, filed on Jun. 27, 2008, the entire contents of which are incorporated herein by reference.

BACKGROUND OF THE INVENTION

1. Field of Invention

The present invention relates to the field of diagnosing a memory leak. In particular, the present invention relates to a method, system and an article of manufacture tangibly embodying a computer readable program for diagnosing a memory leak.

2. Description of the Related Art

At runtime of an application program (hereafter also referred to as a program) written in a programming language that implements Garbage Collection (GC), the memory management functionality is typically provided by application programs themselves. A memory no longer needed by the program is released by the program designer (also referred to as a programmer). If the program can not reasonably release different memories, it results in a waste of the memory resources since these memories can not be used by other programs.

Program errors that lead to such wasted memory are usually termed as "memory leaks". In some programming languages, an automatic memory management is used rather than relying on the programmer to release the memory. Such automatic memory management is called "garbage-collection" (GC) in the art, i.e., an active component of a runtime system associated with the program. Such automatic memory management partly saves the efforts of programmers on memory management, by automatically releasing portions of the memory which are no longer referred by the running programs. However, another disadvantage caused by the automatic memory management is that some objects will reserve the references to the data structures in portions of the memory, but these data structures will not be used in the future execution of the application programs. The references will prevent the automatic garbage collector from reclaiming the unused portions of the memory, and this also leads to "memory leaks".

Although garbage collection helps reduce the issue of "memory leaks", the latter type of memory leaks still exist and may in some instances cause the performance of the computer to degraded and may even cause the running of the application program to consume all the memory thereby causing the computer to crash. Therefore, 'memory leaks' degrade the availability and security of the computer due to their large effect on the performance of the computer.

Usually, there are two kinds of memory leaks: one type is that leaks are produced with faster speed with each execution of leak incurring code and are obvious to notice and the other type is related to the leaks produced from time to time and slowly at runtime.

An important issue to be solved is how to identify objects that are leaking and rapidly confirm the cause of the memory leaks. Typically it is not easy to diagnose the memory leaks of a system, especially for those chronic memory leaks which occur continuously and with small volume each time. It is rather complex to identify an apparently insignificant but potentially important increase on the heap in time. It could be rather late when the memory leaks are found, and in this time the leaking program can caused a significant disadvantage on the entire system. This is especially true for the memory leaks that start out small but continue to grow over time. Sometimes, weeks of service uptime are required before the issue is large enough to be noticeable.

It is very difficult to identify these latent leaks, especially for the online productive system which can not endure multi-heap access, even heap dump, because these systems can not bear the execution pause due to heap traversing. Although there exist various garbage-collection approaches and they have respective benefits, such memory leak is still a disadvantage especially for Java® programs (Java is a registered trademark of Sun Microsystems).

Some existing technologies assist programmers to look inside the black box, to determine the root cause of the memory leak at runtime. For memory leak diagnosis, the existing technologies perform diagnosis mainly by differentiating heap snapshot (a snapshot is a graph that consists of types as nodes and references as connection among them) and according to the volume growth of objects of a particular type.

These technologies monitor the heap after each round of garbage collection and observe a downward-sawtooth pattern (ratio curve pattern of the memory is used) is observed of the free space until the program can not acquire any space from the heap since the used memory can not be efficiently collected and there are fewer available memory resources. The existing technologies can not be used in online system, because this kind of acquisition and analysis of the heap snapshot will cause the system having a large heap capacity to pause for several seconds. For the online system such as servers, these delays or pauses will lead to timeouts, thereby significantly influencing the performance of the online application. Such delays and pauses are undesirable for the online system.

Also, the memory heap of large application program often has a large capacity, and thus an attempt to frequently compare the heap snapshots offers little help for the diagnosis of application programs, because the objects that leak from the application program are not obvious. If the existing technologies are used to perform memory leak diagnosis, the application program will be perturbed a lot due to the frequent comparing operations of the heap snapshots for the memory leak diagnosis, which will bring a negative effect on the service quality and the programmers' experience. Also, in some circumstances, these technologies will perturb the running application programs or systems, thereby having no practical value, especially in the wireless circumstance.

The existing methods for diagnosing memory leaks have a limited effect on the industrial applications, because these existing methods normally recognize mostly the obvious type of memory leaks as suspicious candidates. For example, an existing technology suggests using the references to find objects responsible for the leaks. But the reference can not include the executing context information. The analysis of reference graph needs expertise and often confuses users with respect to complex reference connections, especially a plurality of references caused by a common type. In this case, programmers may still have difficulty knowing the reason as to why these references are produced and the reason of incurring leaks. The correctness of diagnosis and fix is difficult to judge and make.

In practice, taking full reference graph snapshots often and analysis on the references is far too expensive for large-scale online system. From the perspective of memory leak diagnosis, the user must identify the data structures that are likely to have issues. But finding the right data structures to focus on is difficult. When exploring the reference graphs of services (especially for large online system), issues of noise, complexity, and scale make the analysis on the reference graphs a daunting task, especially problematic for long-running systems. Noise effects can dwarf the evidence needed to diagnose a slow leak till the crash occurrence.

In general, the existing technologies mainly focus on the following points: frequent accesses on heap, even heap dump, to produce heap snapshots, comparisons among different snapshots to find growing nodes as leaking candidates, finding suspicious structures, and analyzing reference graphs to find the references causing the inappropriately held memory, for later confirmation. Thus, the methods used for identifying the memory leaking path normally include two steps: detect leak candidates, and diagnose the reason of the leak. But there is a gap between the two phases, and the existing technologies do not help adequately to diagnose the memory leaks.

To sum up, current technologies for diagnosing memory leaks have following disadvantages:

1. High requirements on expertise of the analyzers. The existing approaches require that the user manually distinguishes the real cause of memory leaks from within these cached objects. In general, these approaches swamp the user with too much low-level detail about individual objects that were created, and leave the user with the difficult task of interpreting complex reference graphs in order to understand the larger context. This interpretation process requires a lot of expertise. Even for experts, it usually takes several hours of analysis work to find the root cause of a memory leak.

2. Perturbation caused by heap access. These techniques will in some cases perturb the running service too much to be of practical value, especially in online environments. Comparison and analysis on heap snapshots are needed after acquiring reference graphs, which can cause a system with a large heap size to pause for several seconds. As mentioned above, for servers, these delays or pauses can cause timeout, significantly changing the behavior of the system.

3. Limited leaking analysis based on heap growth. Many existing tools find memory leaks using growth and heap differencing of heap to find the growing objects of heap. Although heap growth is a useful parameter to help judge, there are some issues with only using growth as a heuristic to find leaks. After all, growing objects or types do not have to be leaks and leaks do not have to grow.

4. Limited leaking analysis based on reference graph. Knowing only the type of leaking objects that predominates, often a low-level type such as a 'String', does not help explain why the leak occurs. This is because these Strings are likely to be used in many contexts, and even may be used for multiple purposes within the same data structure, such as a DOM document. In addition, because one low-level leaking object can simultaneously be inappropriately held by a plurality of references, it is easy to get lost quickly in analyzing the reference graph and extracting a reason for memory leakage. A single DOM object typically contains several objects, with a rich network of references among them. Without the knowledge of running program, it is difficult to know which path the reference types of leaks are created or when analyzing allocation call paths, which call site is important.

5. Limited leaking analysis based on allocation stack. Some methods can record allocation stacks of each type object at the same time with monitoring heap, but not all the instances of the suspicion type are leaking, so the real leaking path tends to be buried among all the stacks, and the storage and analysis of these stacks is very likely to be resource intensive. Often, leaking site can not map with the allocation site. For example, Java Database Connectivity (JDBC) is created repetitiously by one agent class invoked by another class, and the invoked class forgets to invoke the JDBC-free function of this agent class. Here the analysis of invoker is necessary.

Overall existing technologies need complex graph analysis and rich programming knowledge to provide even a limited clue for memory leak diagnosis. It is noted that existing methods mainly focus on searching the memory leaks, but rarely focus on recognizing the allocation paths which are directly related with the memory leakage issues.

SUMMARY OF THE INVENTION

According to a first aspect of the invention is provided an apparatus and a method of diagnosing memory leaks at runtime, based on the recognition that the allocation paths possibly associated with incurring leaks may guide the user to identify suspicious objects and execute memory leak diagnosis.

According to a second aspect of the invention, is provided a method for diagnosing memory leaks at runtime, including following steps:

tracing the allocation of objects at runtime of an application program on a virtual machine, to acquire and record allocation paths and allocation time of the objects; counting age generations of the objects of the similar type on their allocated paths at a predetermined time interval; and determining the allocation path of the objects with high-age generations to be the suspicious allocation path possibly having memory leaks, and reporting it to the user for analysis.

According to a third aspect of the invention, is provided an apparatus for diagnosing a memory leak, including:

An object allocation tracing device, for tracing the allocation of objects at runtime on a virtual machine, to acquire and record allocation paths and allocation time of the objects; an allocation path recording device, for recording the allocation paths and the allocation time of each object which are transmitted by the object allocation tracing device; a heap for the application program, for storing information of the allocation path of the objects which is transmitted by the allocation path recording device; an allocation path reading device, for reading the information of the objects of the allocation path in said heap, and scanning an ID of each object and the corresponding allocation path information which are stored in a storage, so as to with respect to each allocation path, organize the objects which are allocated but are still not collected, and count age generations of the objects of the similar type allocated by the allocation path, according to the allocation time of each object; an allocation path ranking device, for ranking the paths according to the age generations of the surviving objects allocated by each allocation path; and a diagnosis reporting device, for analyzing the ranking of the allocation paths which are transmitted by the allocation path ranking device, and determining the high-ranked allocation path to be the suspicious allocation path possibly incurring memory leaks and report it to the user for source code analysis.

According to a fourth aspect of the invention, is provided an apparatus for diagnosing a memory leak, including:

An object allocation tracing device, for tracing the allocation of objects at runtime of an application program on a virtual machine, to acquire allocation paths and allocation time of the objects; an allocation path recording device, for tagging each allocated object with tags including a corresponding relationship between the allocation paths and the allocation objects; a heap for the application program, for storing information of the path allocation of the objects which is transmitted by the allocation path recording device; an allocation path reading device for, with respect to each allocation path, reading the objects allocated by the allocation paths but still not collected, directly according to the tags, and counting age generations of the objects of the similar type allocated by the allocation path, according to the allocation time of each object; an allocation path ranking device, for ranking the allocation paths according to the age generations of the surviving objects allocated by each path; and a diagnosis reporting device for analyzing the ranking of the allocation paths which are transmitted by the allocation path ranking device, and determining the high-ranked allocation path to be the suspicious allocation path possibly having memory leaks to report it to the user for analysis.

BRIEF DESCRIPTION OF THE DRAWINGS

The embodiments of the invention will be described in detail with reference to the accompanying drawings, in which:

FIG. 2 shows a schematic of a structure of tags;

DETAILED DESCRIPTION OF PREFERRED EMBODIMENTS

Figure 1:
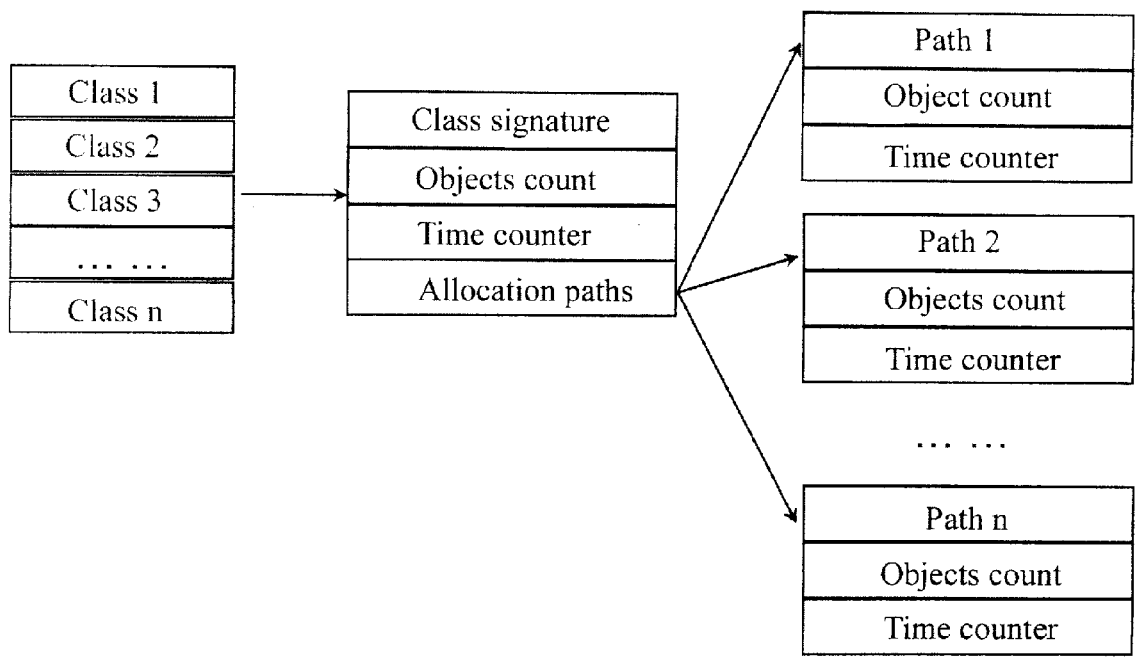
FIG. 1 represents a data structure of the information for managing allocated objects during executing an application program.

A detailed description will be given to exemplary embodiments of the invention. In the drawings, examples of the embodiments are illustrated, and like reference numbers denoted like elements. It should be noticed that the invention is not limited to the disclosed exemplary embodiments. It should also be noticed that not each feature of the method and the device is necessary for implementing the invention to be protected by any claim. In addition, in the whole disclosure, when displaying or describing a process or method, the steps of the method can be executed in any order or simultaneously, unless it is clear in the context that one step depends on another step executed in advance. In addition, there can be a significant time interval between the steps.

It is observed that the leaking objects usually belong to one type, and the instances of the type are continuously generated and allocated during different intervals. Taking this into consideration a class type consistent with this allocation style is recognized. Then, the allocation paths creating the instances of this type are found. The method focuses on objects of one type continuously created over a relatively long interval. To method proposes to trace the allocation of the objects of the similar type by one kind of a data structure. Each object-oriented application program includes objects of different types. With respect to the object of each type, a list for recording its allocation path is created.

FIG. 1 depicts one such data structure that includes a class signature, object counts, time counters and allocation paths (the allocation path of one object is a stack image at its allocation time). The allocation of objects is managed by such data structure. As shown in FIG. 1, for the objects of the similar type, they may be allocated on different paths during the runtime of the application program. Thus, according to the data structure shown in FIG. 1, each allocation path is traced, and the amount of the objects allocated on this allocation path will be recorded by the counter, and when the allocation amount exceeds a certain scale, the corresponding time is recorded in a timer. In other words, the length between the time intervals, for which the allocation amount continuously reaches the certain scale, is recorded in the timer. Tracing the allocation information of the object may be performed by an object allocation tracing device. The information of the object acquired by tracing can be recorded by an allocation path recording device and can be stored into a corresponding storage or directly sent to the heap of the application program.

The recorded object information of the above data structure can be managed by a specified allocation path managing device, and before the related object information is directly sent to the heap, each allocated object is tagged with a special tag, in order to distinguish each object (even the objects of the same type).

FIG. 2 shows the form of such tag. One tag for each allocated object includes a plurality of fields. As for the embodiment of the invention shown in FIG. 2, the first field in the tag structure is an identifier field ID of this object, representing which band and which group the object belongs to. The combination of both of them uniquely indicates an "age generations" at which the object is, in which the age of the object indicates the time from the timing at which it is allocated to the timing at which it is released, and its age generations may use the times for which the object experiences the "garbage-collection" from being allocated to being collected, or the times of the object's existing time with respect to a certain time threshold. Here, it is default that each garbage-collection will retrieve all the allocated objects on the heap. The second field represents a class name, representing which class the object belongs to, such as class 1, class 2, class 3 ... and so on as shown in FIG. 1. The third field belongs to a path field, representing in FIG. 1 on which path the object is located. The fourth field is a method field, which is not a real content of a method signature, but an address which points to the practical storage of the method signature. The last field is a callee field, used for searching the allocation path. This field combines with the fourth field, to recover the content of the path which allocates the designated object.

Figure 3:
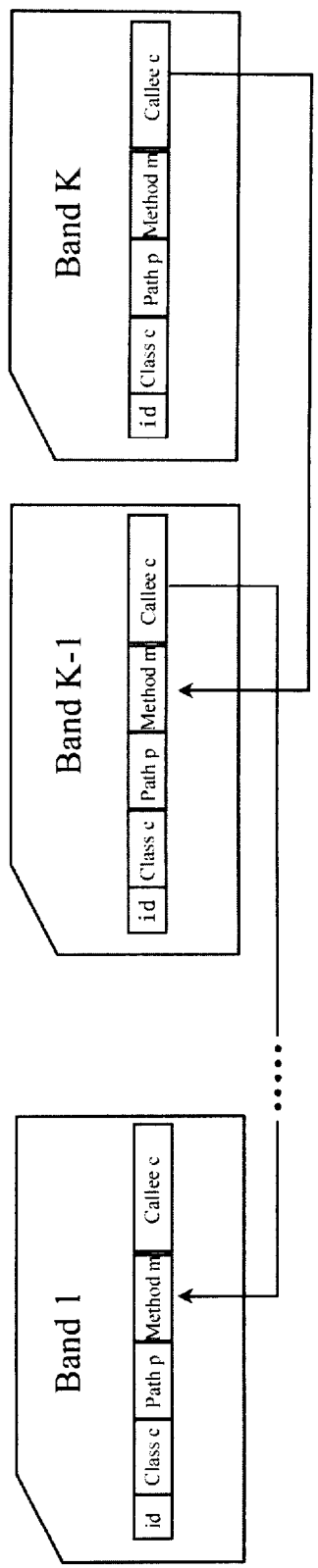
FIG. 3 shows a schematic of invoking relationship between objects of the same type on different bands.

FIG. 3 depicts the recovery process to recover the basic allocation path information. Starting from the tag at a highest band of objects of type C is K (K>=1), one field of the tag is "callee", which refers to the method at band (K−1), called by the method at band K. Iteratively, the chain of methods found is allocation path. That is, the path-finding procedure starts from the highest band.

Figure 4:
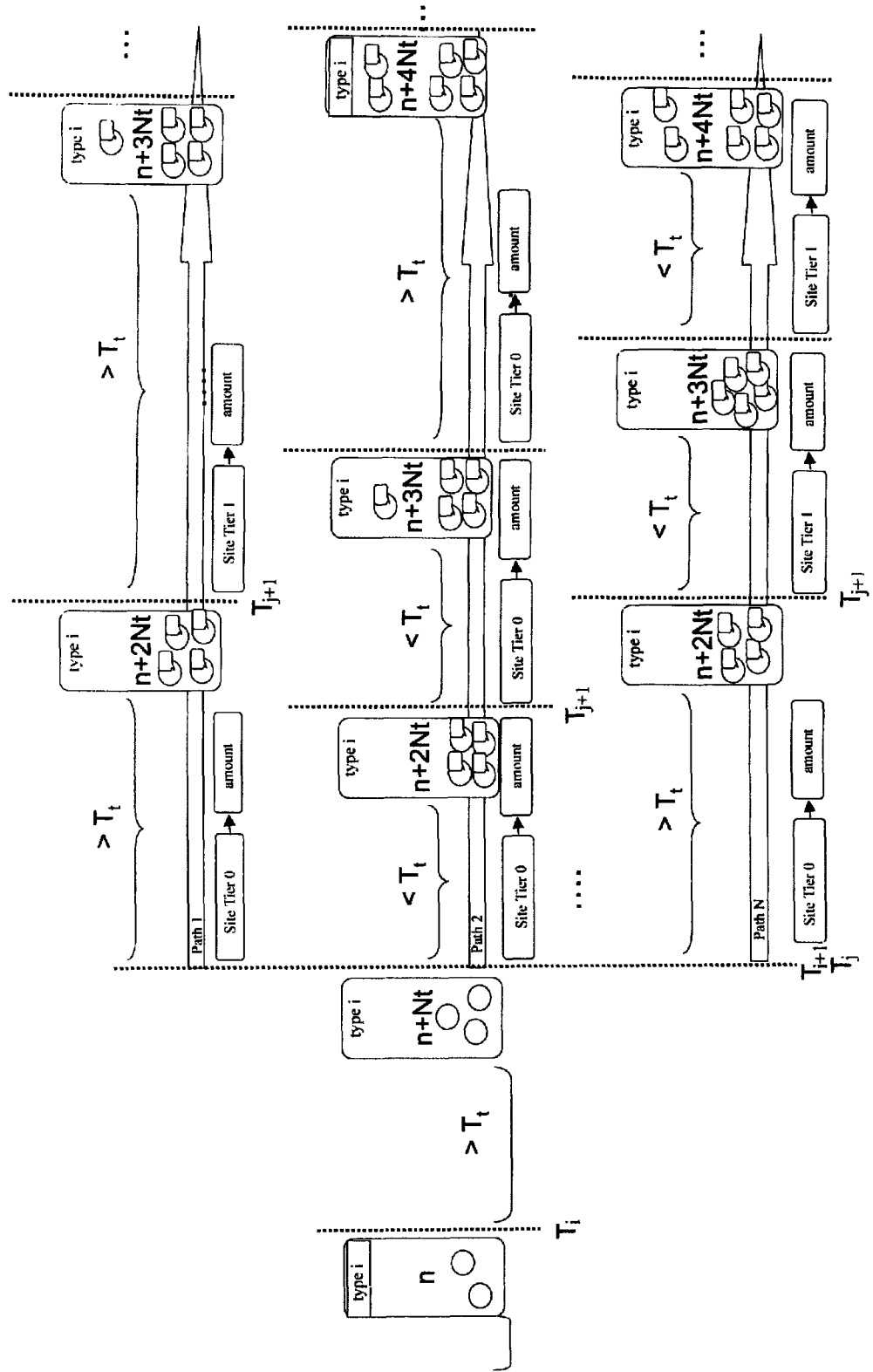
FIG. 4 shows a schematic of a procedure for extracting the allocation path of each object and binding the allocation path with the particular object.

FIG. 4 shows a schematic of the procedure for extracting the allocation path of each object and binding the tags of the allocation path with the particular object. When the application program is run, the allocations of the objects are traced. For the objects of type i, when the total amount of the objects reaches threshold Nt, the time of Ti is recorded, while the counter value is reset to 0. When the total amount of the object reaches threshold Nt again, the time of Ti+1 is recorded. If the difference between Ti and Ti+1 exceeds threshold Tt, the type i is recognized to need tracing and recording procedure of the next stage, and if the type i enters into the recording procedure of the next stage, the path for allocating i object will be recorded, and the total amount of the objects allocated with i type on the path is also recorded. For objects of type i allocated by path Pi, the site of current tier (the tier represents the stack site for allocating the research object, and because the stack is hierarchy structure, the tier is used to indicate the site in the stack) on Pi, which is also called as band, is tagged on the objects. If the difference between Ti and Ti+1 is less than threshold Tt, the count of the type is constant, and increases with the allocation of new instances. When the total amount of objects reaches the threshold Nt again at the time of Tj+1, its amount and the difference between Tj and Tj+1 exceeds the threshold Tt, the amount is reset to 0, and the Tj is replaced with the value of Tj+1, and the tier on Pi is increased, so that the objects allocated later will be tagged by the site of next tier. As such, the same process and judge are executed gradually to the site of each tier on Pi, so that these tiers will be tagged on the objects.

The choice of threshold Tt is helpful to recognize the lifetime distribution during service period. Its default value is set as the average GC (garbage-collection) interval. The choice of Nt is used to schedule the scale or measure of the allocation of the objects. It will help to find relatively frequent allocation path for objects of one type. It is possible for such relatively frequent allocation path for objects of one type to be related with a continuous leaking. When the total amount of allocated objects of one type exceeds the Nt, the object of this type is recognized and its allocation path is needed to notice. When the amount of objects allocated in a fixed path exceed the threshold Nt, this path is recognized and recorded by binding itself with created instances. If the time reaching the threshold is too short (<Tt), the tag bound to the objects is the same. If the time is long enough (>=Tt), a new tag will be given to the allocated objects. This binding interval will result in the interval between the objects marking the combination of different band IDs and group IDs at least longer than Tt. In other words, the combination of the group ID and the band ID uniquely marks the objects of different age generations. This marking manner helps directly to perform memory leak diagnosis at the time of heap access, with the output of both leaking objects and directly related leaking path.

Figure 5:
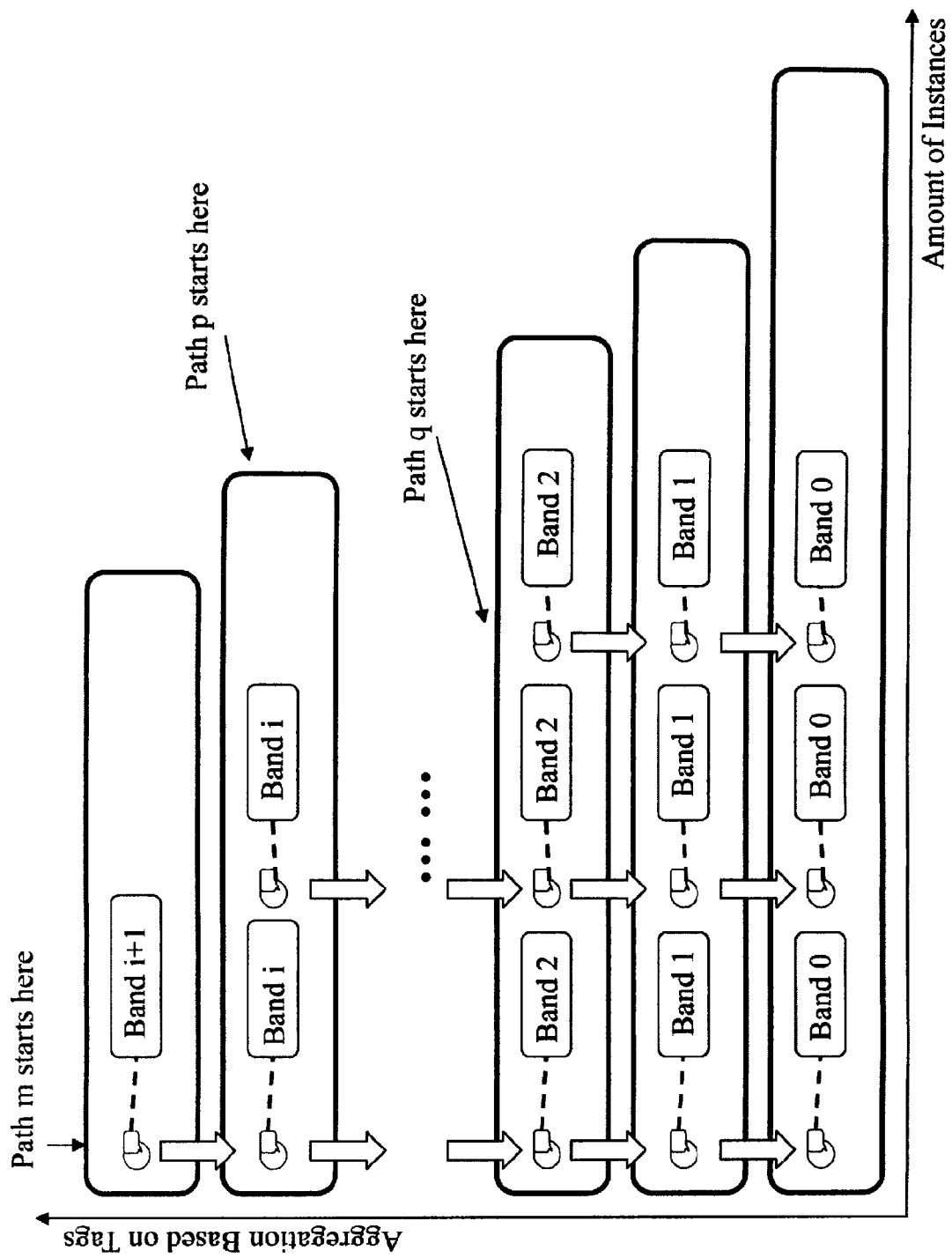
FIG. 5 shows a schematic of a structure of the tiers of different sites as well as the object aggregation.

FIG. 5 shows a schematic of a structure of the tiers of different sites as well as the object aggregation. To distinguish the tiers of different sites (the tier of one site means the tier number where it sits on the whole allocation path), different bands are given according to the depth of different frames on the allocation path. For example, band 0 is given to the allocation sitting on the top of allocation path which creates objects directly and band 1 is given to the allocation site of the caller of site with band 0. This is useful to diagnose leaking objects and trace the allocation path of objects' tag, which are introduced in next two parts. The group ID is introduced to prevent the value of the band from overflow: when the tier number represented by the band exceeds the biggest depth of the allocation path, the group ID increments from 0. Once the band value overflows, the group ID is incremented by 1. The combination of the group ID and the band ID is very important for the later diagnosis.

The following program code represents how to trace the allocation of managed objects based on the data structure as shown in FIG. 1, and is also a program representation for the above particular description. The program code is invoked when the java objects are allocated.

```
New_object ( )
{
```

-continued

```
/*Get class signature of the object's class.*/
classSignature = GetClassSignature( );
/*Find the class index in hashTable, if it's not exist, put it into
hashTable.*/
classIndex = getAndPutClass( classSignature );
/*Increase the object count of this class.*/
countClass( );
/*If count of this class > Nt, count this ojbect to it's allocation path.*/
if( objectCount > Nt ){
    /*Find allocation path in this class structure, if it's not exist, put it into
hashTable.*/
    getAndPutAllocationPath( );
    /*Tag this object with allocation path's band, class index, method
of the allocation path's band its callee.*/
    tagObject(allocPathBand, classIndex, methodOfBand, callee);
    /*Increase the object count of this allocation path of this class .*/
    countAllocPath( );
    /*If the allocation path count > Nt and time since last change of
allocation path's band larger than Tt,then increase band of the allocation
path, and reset its count, and update lastChangeTime*/
    if( countOfAllocPath > Nt && time_interval > Tt )
        moveToNextBand( );
    }}
```

The tracing and recording of the allocation of objects have been described above in detail. Such tracing and recording of the allocation of objects of various types are helpful for finding the leaked objects and the leak incurring paths when diagnosing. When diagnosing, the findings of the leaking classes and the leaking paths are performed synchronously, rather than asynchronously. After several garbage collections, only the information of live objects is saved in the current heap. One thing need to notice is that the live objects are read from heap by their tags instead of the overall heap traversing. The information including the object type, the allocation time, the allocation path etc. can be reserved in the form of the tag bound with the objects, and can also exist in other forms. For example, an allocation path manager can be specially configured to manage the direct corresponding relationship between the allocation time of each object and the allocation path.

In an overall methodology, the similar objects in the tag, based on the combination of the band ID and the group ID, are aggregated into a group. Then, the allocation paths of these objects are recovered from the last two fields of the tag of the object with the highest band. The number of the groups found in this way is the age span or the age generations of the allocation object of the path. The age span or the age generations of the object allocation in the path is acquired for a memory leak diagnosis. In this way, both the objects and the allocation paths causing a memory leak can be found.

Over a long period pf execution, the memory leaks cause the objects of the similar type with different life-cycles to exist on the heap. The life-cycle of the object is the times of garbage-collections in which it has survived. The span count is the amount or generations of different life-cycles of all the instances of one type. A low span count indicates that all the instances of one class have been in memory for about the same amount of time. A high span count indicates that the running application is continuing to allocate new objects of that class without releasing references to older objects of that class, and programs do not intend to intermittently allocate long-lived objects. Instead, they typically allocate long-lived objects at roughly the same time, or allocate objects that are later used for a short time and then removed once they are no longer needed.

FIG. 5 further shows the object aggregation. Live objects are summarized by their tags to diagnose leaking issue. As mentioned above, one tag includes band ID of the site related with the tier on the allocation path and the group ID related with the round of tagging path into objects. Garbage-collection is performed at least once to remove those "dead" objects on the heap, to which are not referenced. As mentioned above, the combination of the band ID and the group ID is bound during different time interval (at least a time of Tt). Time Tt is related with garbage-collection interval and can be used to identify objects' life-cycle. As such, the different combinations of the band ID and the group ID in the tag can distinguish the objects with different life-cycles. Based on the above analysis, the objects having the same combination of the band ID and the group ID in the tag can be aggregated into a group, in order to be aggregated into several groups by the objects allocated with one allocation path. The amount of the groups decides the age generations of the objects allocated with the path. Those allocation paths having the objects with the biggest age generations are recognized as suspicious allocation paths possibly causing the memory leak. Objects tagged with suspicious allocation paths are leaking instances.

After aggregating and knowing the suspicious class, it is needed to determine which allocation paths are causing the memory leaks and which are not, by a reverse process with the process of binding the tag path into objects, and because the particular content of the allocation site and the allocation path helps a lot for the diagnosis and fix of the leaks, it is necessary to go through the whole path. To resolve the issue, the reverse process with the process of binding the tag path into objects is performed to recover exact leaking path from the tag.

Figure 6:
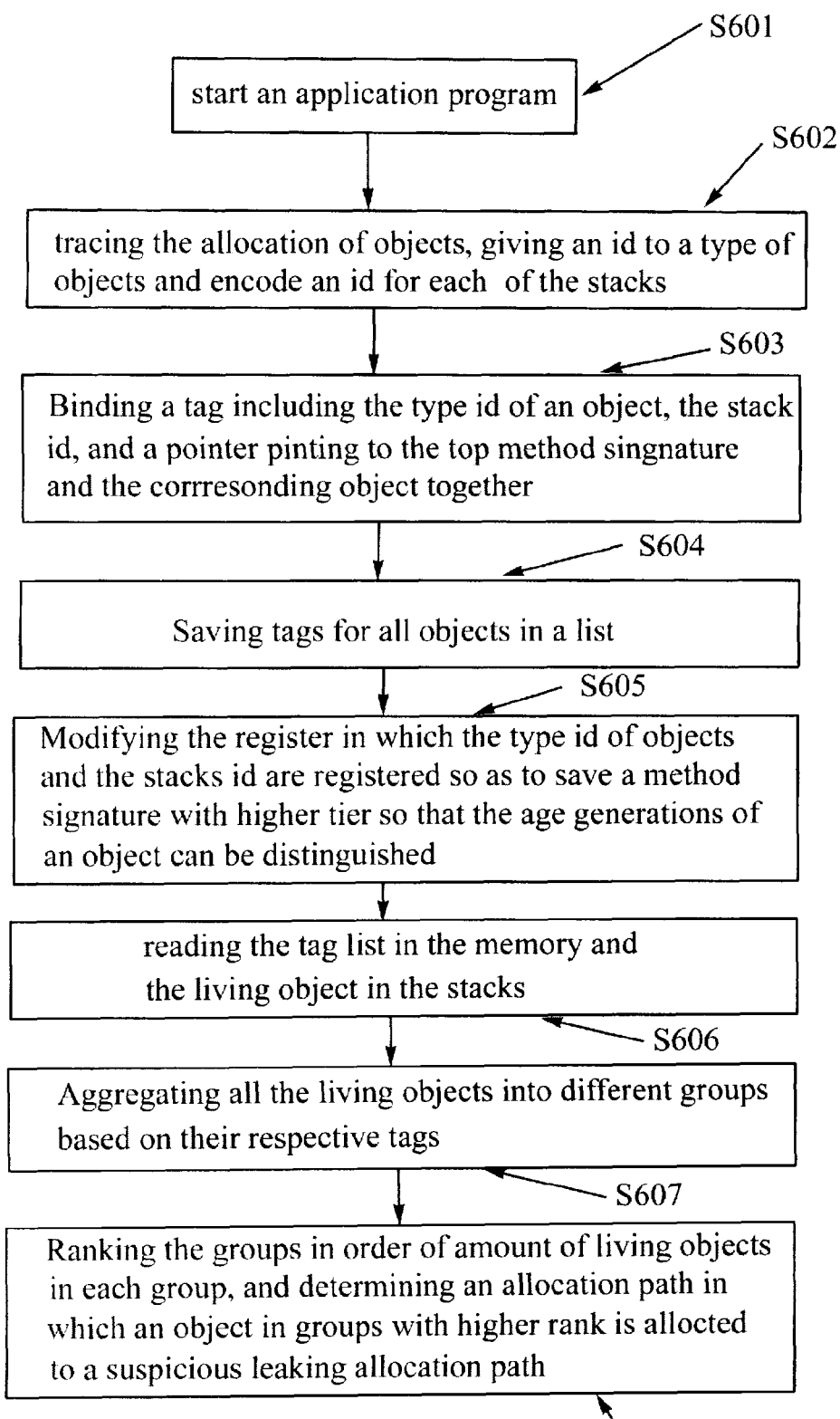
FIG. 6 shows a flowchart of memory leak diagnosis process.

FIG. 6 shows a flowchart of memory leak diagnosis caused by one application program. Firstly, one application program is run, and at step S601, a memory leak diagnosing device to be described later begins to monitor the object allocations and the memory allocations at the runtime of the application program, as the application program begins to run. At step S602, an object allocation tracing device in the memory leak diagnosing device traces the object allocations at runtime, and with respect to the objects of each type, the type of the current object and the allocated stack are acquired, the unique IDs are coded to each of the stacks, an unique ID corresponding to one allocation path is given to each object, and the corresponding relationship is stored. Then, at step S603, the tag including the type ID of the object, the ID of its stack and the pointer which points to the top method signature, is bound with the corresponding object. The top method signature is not in the registers. All the method signatures are coded and saved in a proxy, and such series of different signatures represents various allocation paths. Therefore, the tag bound with the object includes the allocation path of the object and the type of the object. At step S604, the tags of all the objects are saved in one list. In particular, the list is managed by the allocation path managing device to be described later, so as to manage the data included in the tag in the list, such as the object type ID, its stack ID, and the pointer which points to the top method signature. At step S605, after a preset time interval, for example after a predetermined interval during which the automatic garbage-collection device executes an automatic garbage-collection once, the register with the ID of the object type ID and the stack ID is modified so as to store the method signature with a higher tier or band, thereby causing the objects to be allocated later and the objects which were allocated before the interval to have different age generations. Said time interval can be a predetermined time interval, such as average garbage-collection interval. The modification of said register can be triggered by a particular event. The particular event can be that the total amount of the objects of a certain type and stack reaches a certain threshold which is specified by the user according to the use scale of the memory of the application program, or can be some event needed to focus on. At step S606, when the user needs to perform memory leak diagnosis, the device is read by the allocation path reading device to be described later, and the information about the list of the tags and the allocation objects located in the heap is read from a fixed storage. Then at step S607, the respective tags are extracted from the read tag list, and all the live allocation objects are aggregated into different groups according to the tags. Then at step S608, the total amounts of the objects in each group with the same tag are ranked, and the allocation path, at which the objects (the objects with higher age generations) in those high-ranked groups are, is determined as a suspicious memory leaking path. It should be understood that the above methods are preferred embodiments of the invention, but not all the steps are necessary for resolving the issue proposed by the invention, and the steps of the above methods can be performed in any order or simultaneously, unless it is clear in the context that one step depends on another step executed in advance. In addition, there can be significant time interval between the steps.

The methods for diagnosing memory leaks have been described in detail above. Compared with the existing technologies, these methods have following advantages: the users do not need to produce reference graphs and analyze the reference graphs of the objects, but can directly acquire the allocation paths corresponding to the suspicious leaking objects by binding the allocation time and the allocation path with the allocation objects; helpful to fix leaks; easy to find code-tracking entry and find how objects allocated is used; especially it is possible to find the leaking objects and determine the candidate allocation paths simultaneously, and the candidate allocation paths can be implemented by accessing the heap only once. The methods help to free users from complex work on interrupt and analysis, and avoid the system from multi-access to heap or heap dump, thereby reducing the diagnosis time. In addition, the methods of the invention need no modification to the existing virtual machine, no modification to the internal GC mechanism, no de-allocation of the event listening, and even no consideration about the movement of the objects.

Figure 7:
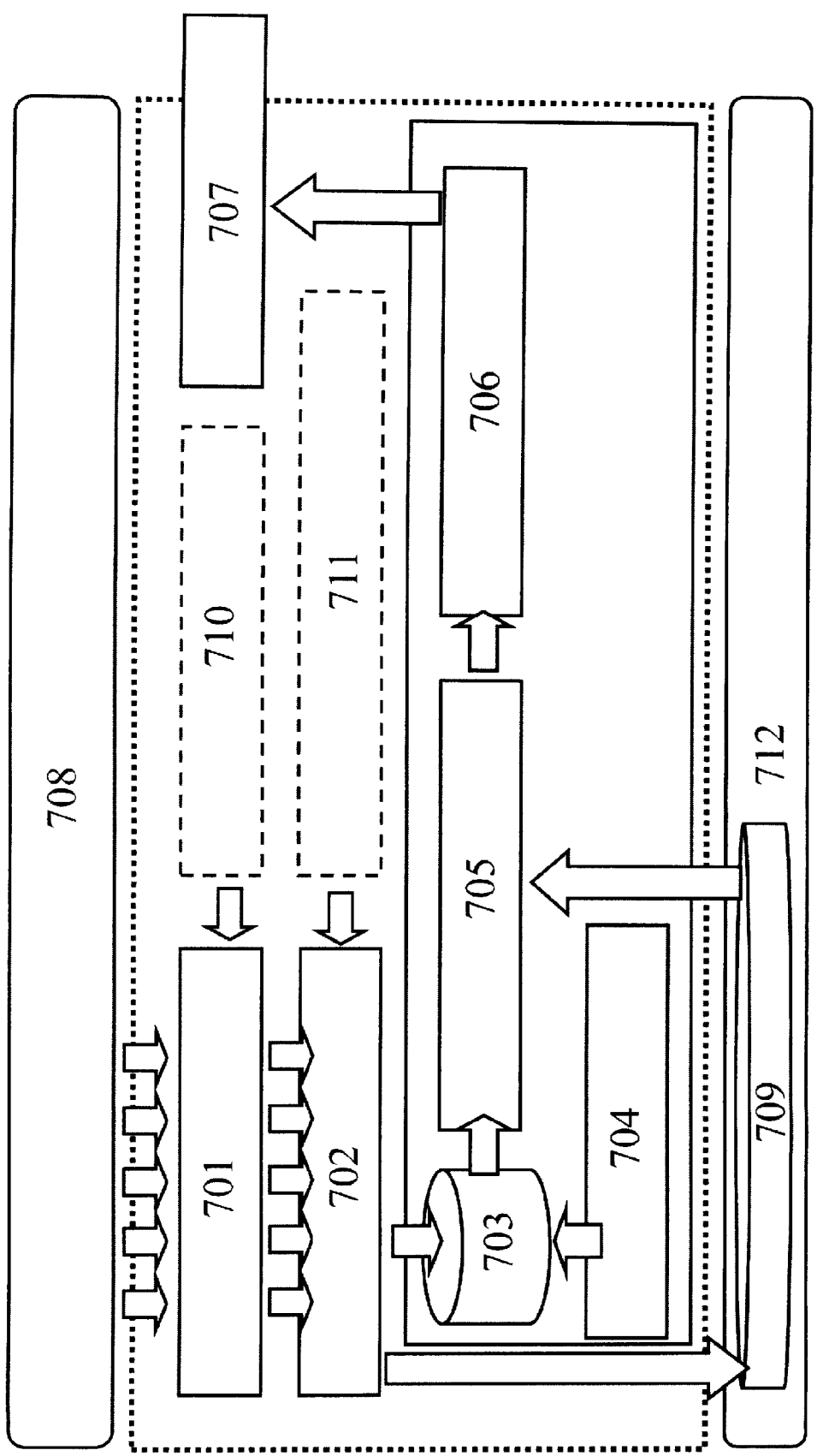
FIG. 7 shows one embodiment of an apparatus for diagnosing memory leaks.

FIG. 7 is one embodiment of the apparatus using the above methods.

As shown in FIG. 7, the apparatus 700 for diagnosing memory leaks according to the invention includes: an object allocation tracing device 701, for tracing the allocations of the objects during the running of an application program 708 on a virtual machine 712, to acquire the allocation paths and the allocation time of the objects; an allocation path recording device 702, for recording the allocation paths and the allocation time of each object transmitted by the object allocation tracing device 701; a storage 703, for storing the allocation paths and the allocation time related with the objects which are transmitted by the allocation path recording device 702; an allocation path managing device 704, for managing the data stored in the storage, and giving one unique ID corresponding to one allocation path to each object, and storing this corresponding relationship into the storage; a heap 709 for the application program, for storing information of the path allocation of the objects which is transmitted by the allocation path recording device 702; an allocation path reading device 705, for reading the information of the path allocations of the objects in said heap, and scanning the ID of each object and the corresponding allocation path information which are stored in a storage, so as to with respect to each allocation path, organize the objects which are allocated by it and are still not collected, and count age generations of the objects of the same type which are allocated by the path, according to the allocation time of each object; an allocation path ranking device 706, for ranking the allocation paths according to the age generations of the surviving objects allocated by each path; and a diagnosis reporting device 707, for analyzing the ranking data of the allocation paths which are transmitted by the allocation path ranking device, and determining the high-ranked allocation path to be the suspicious allocation path possibly incurring memory leaks to report for users' analysis.

Figure 8:
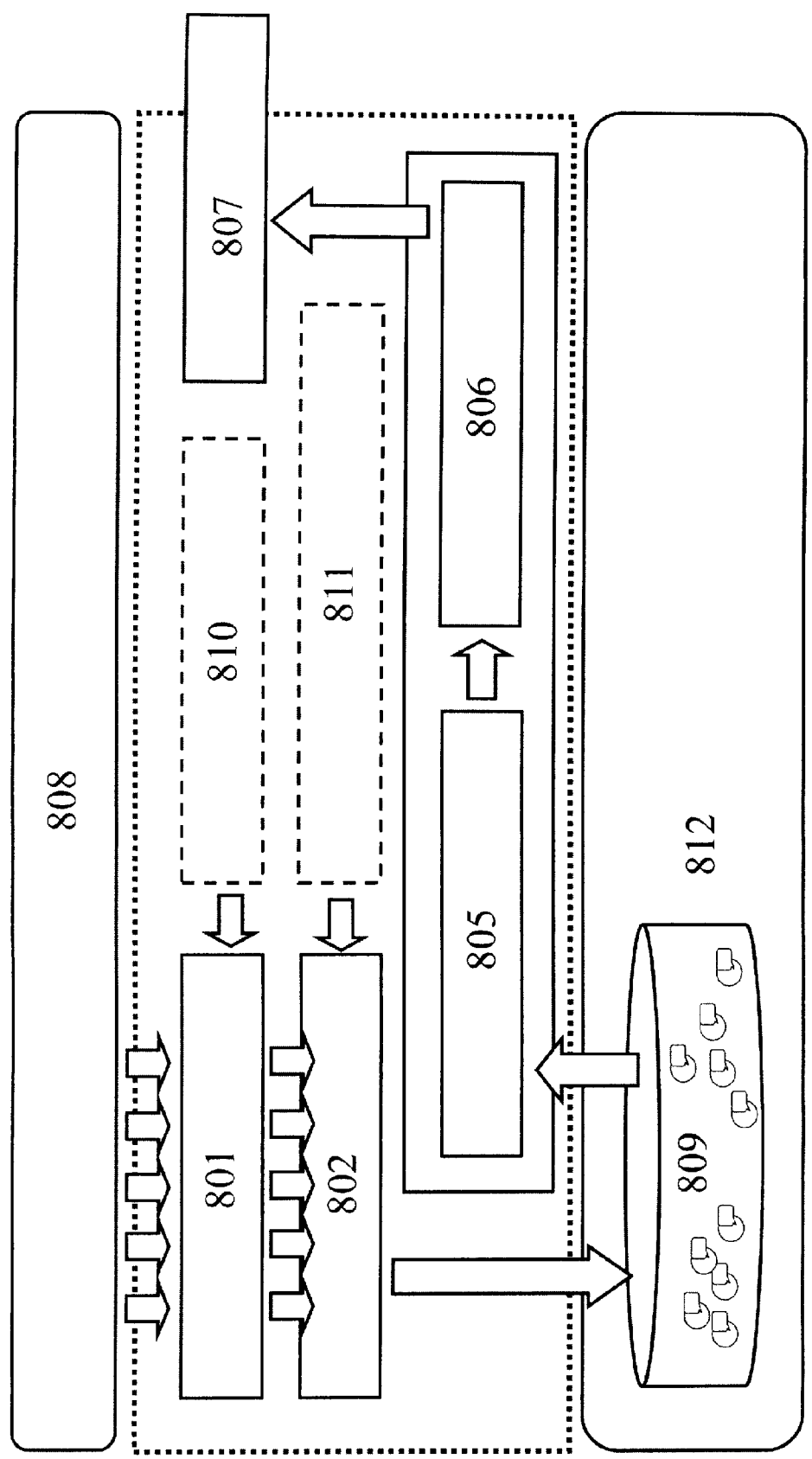
FIG. 8 shows another embodiment of the apparatus for diagnosing memory leaks.

FIG. 8 is another embodiment of the apparatus using the above method.

As shown in FIG. 8, the apparatus 800 for diagnosing memory leaks according to the invention includes: an object allocation tracing device 801, for tracing the allocations of the objects during the running of a application program 808 on a virtual machine 812, to acquire the allocation paths and the allocation time of the objects; an allocation path recording device 802, for tagging on each allocated object with tags including a corresponding relationship between the allocation paths and the allocation time; a heap 809 for the application program, for storing information of the path allocations of the objects which is transmitted by the allocation path recording device 802; an allocation path reading device 805, for, with respect to each allocation path, reading the objects which are allocated by it and are still not collected, directly according to the tags, and counting age generations of the objects of the same type which are allocated by the path, according to the allocation time of each object; an allocation path ranking device 806, for ranking the allocation paths according to the age generations of the surviving objects allocated by each path; and a diagnosis reporting device 808, for analyzing the ranking data of the allocation paths which are transmitted by the allocation path ranking device 806, and determining the high-ranked allocation path to be the suspicious allocation path possibly incurring memory leaks to report for users' analysis.

The above apparatuses 700 and 800 for diagnosing memory leaks further include object life-cycle managing devices 710 and 810, and dynamic bit code devices 711 and 811. The object life-cycle managing devices 710 and 810 are used to directly count the ages of the objects according to Objects' allocation time, avoiding directly putting the allocation time into said heap. The dynamic bit code devices 711 and 811 can use a method of binary code injection to acquire the allocation paths, rather than directly reading the content of the stack at running to acquire the path information.

The description of the invention is provided only for the purpose of illustration, and is not intended to limit the invention to the disclosed embodiments. Many modifications and alternations can be understood by the person skilled in the art. Choosing these embodiments is to explain the principle and the practical application of the invention, and to make the person skilled in the art understand the invention, so as to implement various embodiments with various modifications adapted to other expected uses.

What is claimed is:

1. A method for diagnosing a memory leak, the method comprising:
   tracing allocation of at least one object performed at runtime on a virtual machine, the object being created by an application program wherein the tracing including:
   acquiring corresponding allocation paths and corresponding allocation times of the objects; and recording the corresponding allocation paths and the corresponding allocation times of the objects, with the recording comprising assigning a unique identifier (ID) to each of the objects corresponding to the allocation path;
   counting age generations of the objects of a similar type based on the corresponding allocation paths at a preset time interval;
   identifying a suspicious allocation path having the objects with high age generations; and
   reporting the suspicious allocation path to a user, wherein the user analyzes the objects with suspicious allocation paths to be a cause for the memory leak;
   wherein the assigning further comprises aggregating a band ID and a group ID of each of the objects, wherein the band ID and the group ID are related to the allocation path into a tag, and binding the tag with the corresponding object, wherein the tag further includes information about a type of the corresponding object, the allocation path, an address pointing to a storage of a method signature and a callee.

2. The method of claim 1, wherein the tracing is performed by using a data structure, the data structure including a signature of a class to which the objects belong, an object count, a time count and the allocation path.

3. The method of claim 1, wherein the counting further comprises:
   determining the allocation path to which each objects belongs, based on the unique ID assigned to each of the objects corresponding to the allocation path allocating the object;
   organizing the objects, with respect to each of the allocation paths, allocated by each of the allocation paths but still not collected; and
   counting the age generations of the objects of the similar type allocated by the allocation path, according to the allocation time of each object.

4. The method of claim 3, wherein the counting begins from a highest band ID of the allocation paths to which the objects belong.

5. The method of claim 3, further comprising:
   performing at least one garbage-collection prior to organizing the objects.

6. The method of claim 1, wherein the preset time interval is one of a garbage-collection interval and an interval during which a total amount of the objects corresponding to a particular type of objects and a stack reaches a specified threshold.

7. The method of claim 1, wherein the identifying further comprises:
   ranking the allocation paths depending on the age generations of the objects of the similar type allocated by each of the allocation paths and survive;
   analyzing the ranking of the allocation paths; and
   determining a high-ranking allocation path to be the suspicious allocation path.

* * * * *